United States Patent [19]

Fukushima

[11] Patent Number: 4,650,170
[45] Date of Patent: Mar. 17, 1987

[54] VIBRATION-PROOFING DEVICE
[75] Inventor: Naoto Fukushima, Kamakura, Japan
[73] Assignee: Nissan Motor Co., Ltd., Yokohama, Japan
[21] Appl. No.: 623,459
[22] Filed: Jun. 22, 1984
[30] Foreign Application Priority Data Jun. 27, 1983 [JP]  Japan .................... 58-115689

[51] Int. Cl.⁴ ............................................. F16M 1/00
[52] U.S. Cl. .................................. 267/140.1; 188/378;
267/8 R; 248/638; 248/562
[58] Field of Search ............... 267/33, 35, 152, 153,
267/140, 140.1, 140.2, 140.3, 140.4, 140.5, 141,
141.1, 141.2, 141.3, 141.4, 141.5, 141.6, 141.7,
63 R, 8 R; 180/312; 248/636, 638, 562, 542;
188/299, 298, 267, 378, 379, 380, 1.11, 8 R;
280/707, 711

[56] References Cited

U.S. PATENT DOCUMENTS

| | | | |
|---|---|---|---|
| 2,854,100 | 9/1958 | Bowser et al. | 188/379 |
| 2,887,071 | 5/1959 | Settles | 188/379 |
| 2,964,272 | 12/1960 | Olson | 188/267 |
| 4,154,206 | 5/1979 | Le Salver et al. | 123/192 R |
| 4,159,091 | 6/1979 | Le Salver et al. | 248/562 |
| 4,391,435 | 7/1983 | Pham | 267/140.1 |
| 4,424,961 | 1/1984 | Takei | 248/562 |
| 4,428,569 | 1/1984 | Takei | 248/562 |

FOREIGN PATENT DOCUMENTS 2041488  9/1980  United Kingdom ............ 267/140.1

Primary Examiner—Duane A. Reger
Assistant Examiner—Alvin Oberley
Attorney, Agent, or Firm—Schwartz, Jeffery, Schwaab, Mack, Blumenthal & Evans

[57] ABSTRACT

A vibration-proofing device according to the present invention includes at least one fluid chamber in which fluid is filled between a vibrating member and a vibrated member. The fluid chamber is formed which expands and contracts from the vibration of the vibrating member. In the fluid within this fluid chamber, opposite phase pulsations are generated by means of a vibrator. The vibrator comprises an almost plate-shaped member fabricated from a magnetic material, which makes up one part of a partition forming the fluid chamber. The vibrator is activated by solenoids.

6 Claims, 9 Drawing Figures

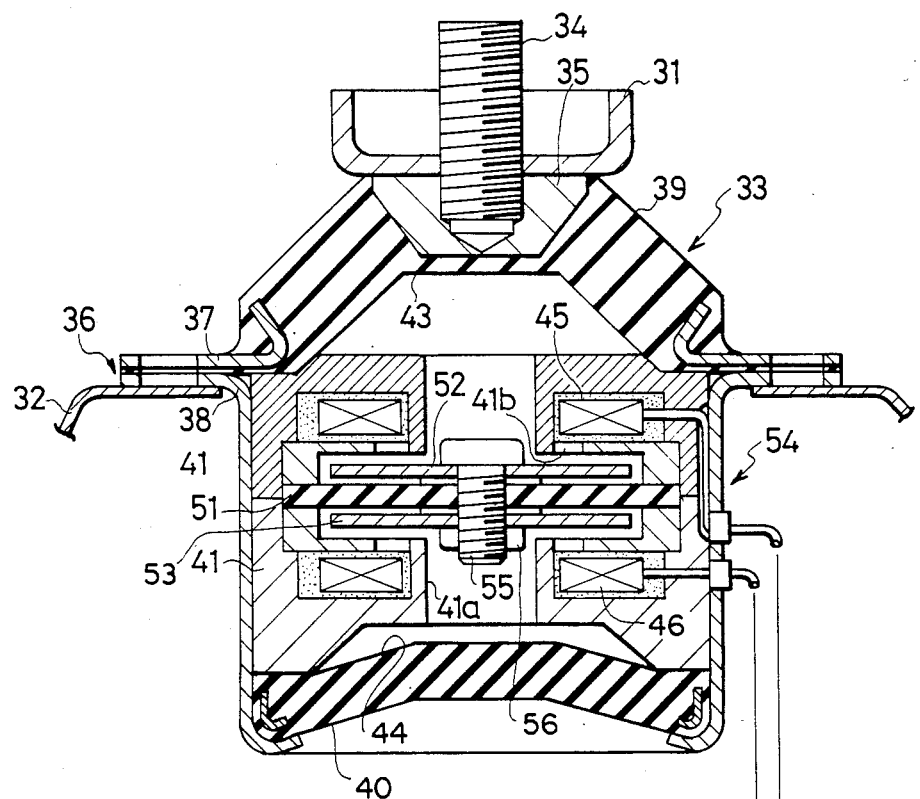
FIG. 5
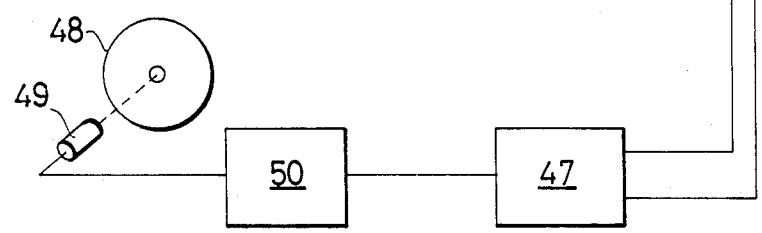

VIBRATION-PROOFING DEVICE

BACKGROUND OF THE INVENTION

1. Field of the Invention

The present invention relates to a vibration-proofing or vibration-isolating device and, more particularly, to a device which has a fluid chamber for supporting a vibrating member and for preventing the transmission of vibration by applying onto a fluid within the fluid chamber pulsations in opposite phase with respect to pulsations caused by the vibrating member.

2. Description of the Related Art

In general, vibration-proofing or vibration-isolating devices are incorporated in supporting devices for vibrating members, particularly for vibrating members which generate multiple vibrations. These vibration-proofing devices prevent the transmission of vibrations, and also tend to damp those vibrations. For example, in a vehicle, high frequency vibrations (secondary vibrations) having the same frequency as a component of the multi degree vibration of the engine rotation are produced in a power unit of the vehicle by the explosive reaction in the combustion chamber of the engine. Also, low frequency vibrations are produced in the body of the vehicle as a result of thrust from the road surface when the vehicle is running.

In U.S. Pat. No. 4,154,206, there is disclosed a suspension device for a vehicle to eliminate the transmission of vibrations from an engine to a support structure wherein a chamber is defined by a flexible wall and filled with liquid to improve the vibration level in the interior of the vehicle.

Vibration-proofing devices, shown in FIG. 1 and FIG. 2 attached to the present specification, are incorporated in a mounting unit which supports the power unit in the body. As well as preventing the transmission of secondary vibrations to the body, this vibration-proofing device damps out low frequency vibrations, and prevents shock to the power unit caused by these low frequency vibrations.

In the vibration-proofing or vibration-isolating device shown in FIG. 1, a first fluid chamber 5 and a second fluid chamber 6 are positioned between a housing main body 3, which is secured to a bracket 1 on the power unit side, and a frame body 4, which is secured to a bracket 2 on the body side. The first fluid chamber 5 and the second fluid chamber 6 are filled with fluid, and expand and contract according to the relative vibrations of the power unit and the body. The chambers 5 and 6 are partly defined by first and second elastic members 7 and 8 respectively which are made of an elastic material such as rubber. The first fluid chamber 5 communicates, through an orifice 11a formed in a first partition 11, with a third fluid chamber 10. The third fluid chamber 10 is constructed so that it can expand and contract by means of a diaphragm 9. The second fluid chamber 6 communicates, through an hole 14a formed in a second partition 14, with a fourth fluid chamber 13. The fourth fluid chamber 13 is constructed so that it can expand and contract by means of a bellows 12. The bellows 12 penetrates the housing main body 3 in a freely slideable manner, and is elastically deformed in response to the vibrations of a vibrating element 16 which is activated by means of a solenoid 15. Pulsations are generated in the fluid within the fourth fluid chamber 13, that is, in the fluid within the second fluid chamber 6. The solenoid 15 is connected to a control circuit 18 through a drive circuit 17 to be controlled according to the crank angle of an engine E of the power unit which is detected by a crank angle sensor 19.

In this type of vibration-proofing device, when secondary vibration is produced in the power unit from the action of the piston strokes or the explosive reaction of the combustion chamber of the engine E, the vibrator 16 is activated when electricity flows in the solenoid 15, therefore the bellows 12 is driven by means of the vibrator 16 so as to expand and contract. Accordingly, pulsations in opposite phase with respect to pulsations caused by the secondary vibration are generated by the elastic deformation of the bellows 12 in the fluid within the second fluid chamber 6. As a result, the transmission of secondary vibrations to the body is prevented. In this vibration-proofing device, the fluid within the first fluid chamber 5 and the third fluid chamber 10 flows through the orifice 11a when low frequency and large amplitude vibration is generated. Thus, the vibrations are damped out.

In the vibration-proofing device shown in FIG. 2, a first fluid chamber 22 is defined by a flexible wall 23 between a power-unit-side mounting member 20 and a body-side mounting member 21. The first fluid chamber 22 is filled with fluid and capable of expanding and contracting, coping with the vibration between the power unit and the body. In addition, a diaphragm 24, which is attached to the body-side mounting member 2, defines a second fluid chamber 26. The second fluid chamber 26 is capable of expanding and contracting and separated from a fluid chamber 22 by a partition 25. The orifice 25a, which communicates with the first fluid chamber 22 and the second fluid chamber 26, is formed in the partition 25. At the same time, a control chamber 27 is defined by a cover 29 fitted into an indented section. The control chamber 27 communicates with the first fluid chamber 22 through a first control orifice 29a formed in the cover 29, and communicates with the second fluid chamber 26 through a second control orifice 25b formed in the low indented wall of the partition 25. In addition, a control plate 28 is enclosed and floats in the fluid in the control chamber 27. This control plate 28 is pressurized by the flow of fluid through the first control orifice 29a and the second control orifice 25b into the control chamber 27, and closes off the first control orifice 29a or the second control orifice 25b.

In this type of vibration-proofing device, when high frequency low amplitude vibrations are generated in the power unit, the fluid in the first fluid chamber 22 and second fluid chamber 26 flows through the first control orifice 29a and the second control orifice 25b. Because there is flow through the orifice 25a, *the spring constant of this vibration-proofing device drops, and the vibration transmitted to the body from the power unit is reduced. In addition, when low frequency high amplitude vibrations are generated at the body side, both the volumes change in the first fluid chamber 22 and the volume of fluid flowing through the first control orifice 29a* increases. As a result, the control plate 28 has pressure applied by the fluid, and the first control orifice 29a or the second control orifice 25b is blocked off. Accordingly, the fluid flows through the orifice 25a only and the vibrations are damped.

However, the vibration-proofing device shown in FIG. 1 drives the bellows 12 by means of the vibrator 16, resulting in requiring vibrator 16 to be heavy. This requires a large vibration-proofing device and offers considerable restriction on its installation, as well as necessitating a large model solenoid 15. It also has the drawback of requiring a large consumption of electrical power. In particular, the solution of these defects is urgently required in the event that the movement of the vibrator 16 must follow up high frequency vibrations to cause this vibration-proofing device to function effectively against high frequency vibrations.

In addition, in the vibration-proofing device shown in FIG. 2, the entire spring constant is reduced as a result of the communication between the first fluid chamber 22 and the second fluid chamber 26, thereby preventing transmission of the high frequency vibration. In other words, this vibration-proofing device has the drawback of not being able to adequately diminish the transmitted high frequency vibrations because it does not actively possess the function of preventing the transmission of vibration.

OBJECTS AND SUMMARY OF THE INVENTION

It is an object of the present invention to provide a vibration-proofing device in small size and light weight.

It is another object of the present invention to provide a small-sized, light weight vibration-proofing device without a decline in vibration-proofing performance against high frequency vibration.

It is another object of the present invention to provide a vibration-proofing device having an excellent ability to follow up high frequency vibration.

It is another object of the present invention to provide a vibration-proofing device which is capable of constructing a vibrator thereof in small size and light weight to cause pulsations in liquid in the vibration-isolating device.

It is another object of the present invention to provide a vibration-proofing device having a fluid chamber provided between a vibrating member and a vibrated body and filled with liquid so as to expand and contract to support the vibrating member.

It is another object of the present invention to provide a vibration-proof device having a fluid chamber filled with liquid which is subjected to pulsations which have opposite phase to pulsations caused by the vibration of the vibrating member.

Briefly described, these and other objects of the present invention are accomplished by the provision of at least one fluid chamber between a vibrating member and a vibrated member in which fluid is filled, and which expands and contracts in correspondence with the vibration of the vibrating member. In the fluid within this fluid chamber, pulsations occur in opposite phase with respect to pulsations generated by means of the vibrating member. The means for providing the pulsations in opposite phase may comprise a substantially plate-shaped member fabricated from a magnetic material, which makes up a partition partly defining the fluid chamber.

BRIEF DESCRIPTION OF THE DRAWINGS

These and other objects, features, and advantages of the present invention will be more apparent from the following description of a preferred embodiment, taken in conjunction with the accompanying drawings, in which:

FIG. 5 is a cross-sectional view of a third embodiment of the present invention;

DETAILED DESCRIPTION OF THE PREFERRED EMBODIMENTS

Here, several embodiments of the present invention are explained, based on the drawings. Furthermore, in each of the embodiments described below, the vibration-proofing device of the present invention is shown in the application as a mounting device positioned between the power unit and body of a vehicle.

Figure 1:
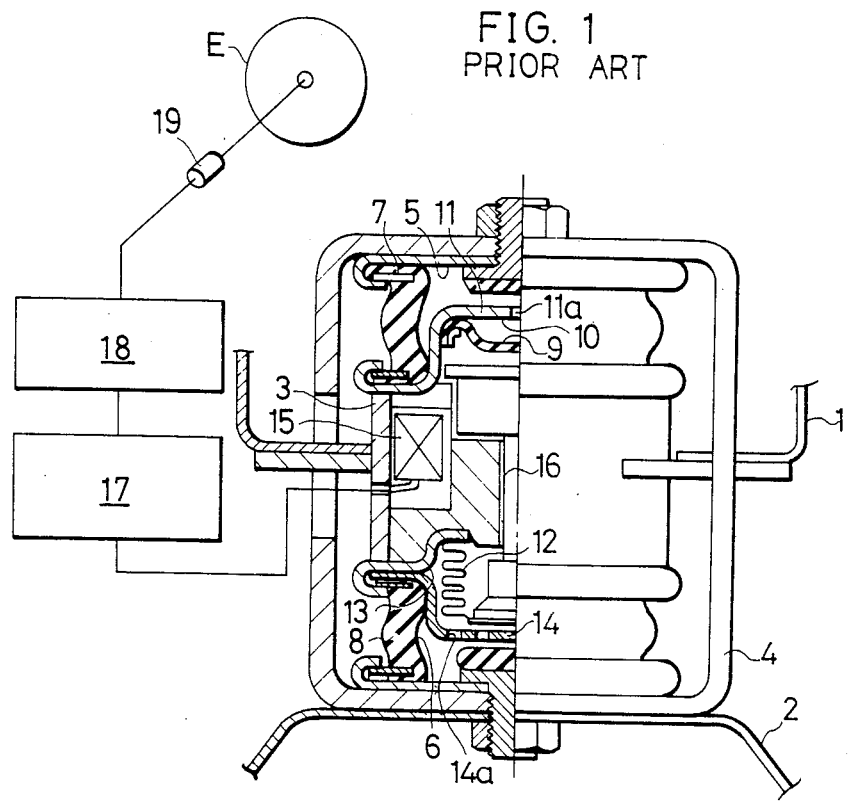
FIG. 1 is a partial cross-sectional view of a conventional vibration-proofing device.
Figure 2:
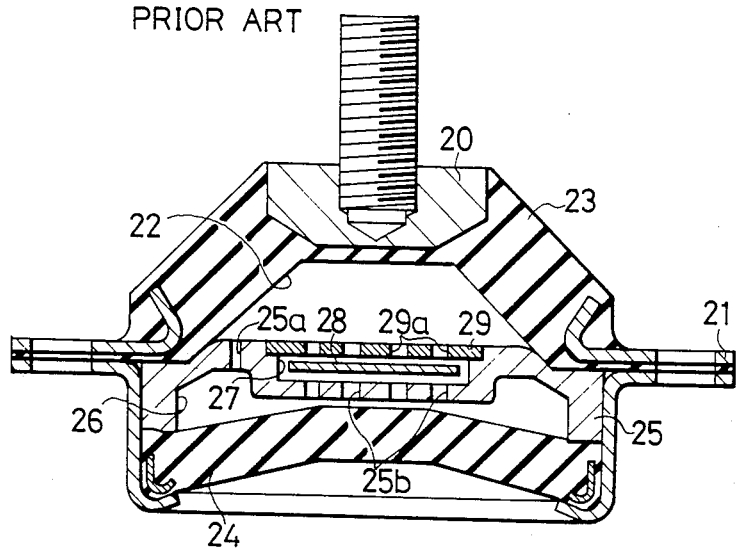
FIG. 2 is a cross-sectional view of another conventional vibration-proofing device.
Figure 3:
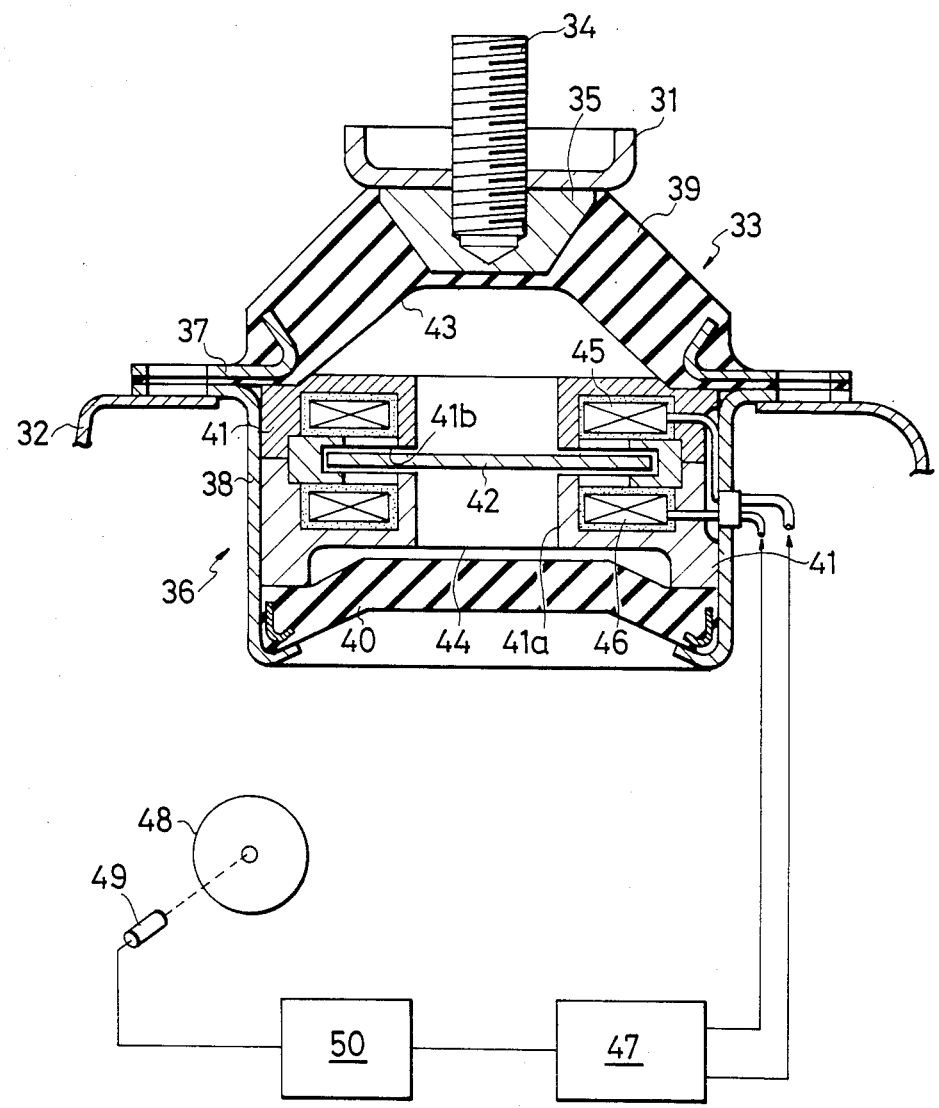
FIG. 3 is a cross-sectional view of a first embodiment of the present invention.

Referring to FIG. 3, there is shown a first embodiment of a vibration-proofing or vibration-isolating device according to the present invention.

First, the construction of the vibration-proofing device is explained. A bracket 31 is provided on a power unit which is not shown in the drawing. A bracket 32 is provided on a body which is not shown in the drawing. The vibration-proofing device includes a mounting unit 33 which is positioned between the brackets 31 and 32. The mounting unit 33 is attached between the power unit and the body in several locations, which are not shown on the drawing, and it provides support for the power unit to the body.

The mounting unit 33 has a first mounting member 35, which is secured to the bracket 31 on the side of the power unit by a bolt 34, and a second mounting member 36, which is secured to the bracket 32 on the side of the body. In addition, the second mounting member 36 comprises a substantially-circular rigid plate 37 and an substantially-tubular frame member 38 connected to the rigid plate 37. A tubular-shaped first elastic member 39 made of an elastic material such as rubber is positioned between the first mounting member 35 and the rigid plate 37. In addition, a tubular second elastic member 40 made of an elastic material such as rubber is set into the open end of the frame member 38. The first elastic member 39 secures its open end section at the lower part thereof to the rigid plate 37, as well as securing its upper end section thereof to the first mounting member 35. Fitted onto the frame member 38 is a substantially cylindrical casing 41 which is formed with an open orifice 41a. In the casing 41, a circular groove 41b is formed, which is open to the open orifice 41a. In this groove 41b, an substantially disk-shaped flat vibrator 42 constructed from a ferro magnetic material is freely inset so as to be freely displaceable in the top to bottom direction in the drawing. The vibrator 42, the first elastic member 39, and the casing 41 forms a first fluid chamber 43. The vibrator 42, the second elastic member 40, and the casing 41 forms a second fluid chamber 44. It will be noted that the vibrator 42 is a partition between the first and second fluid chambers. An incompressible fluid such as oil, for example, is filled into a first fluid chamber 43 and the second fluid chamber 44, and the vibrator 42 floats in this fluid. It is possible to vary the volume of the first fluid chamber 43 as a result of the relative displacement of the brackets 31 and 32, that is, as a result of the deformation of the first elastic member 39. It is also possible to vary the volume of the second fluid chamber 44 as a result of the deformation of the second elastic member 40. In additon, each of some ring-shaped solenoids 45 and 46 are stored within the casing 41 and spaced apart from each other in the direction of the displacement of the vibrator 42. These solenoids 45 and 46 are each connected to a drive circuit 47, and they are alternatively powered by the drive circuit 47 to activate the vibrator 42.

A crankshaft 48 of the power unit is provided with a crank angle sensor 49 to detect the crank angle of the crankshaft 48. The crank angle sensor 49 is wired to a control circuit 50 and the signal which indicates the crank angle is output to the control circuit 50. The control circuit 50, according to the output signal from the crank angle sensor 49, outputs to a drive circuit 47 a pulse signal which is synchronous with the secondary vibrations of the power unit. The drive circuit 47, according to the pulse signal of the control circuit 50, applies an opposite phase drive current to each of two solenoids 45 and 46 which activates the vibrator 42. When both the body and the power unit are displaced in the bounding direction by secondary vibrations, that is, in the direction to make bracket 31 and 32 close to each other, the drive current output by the drive circuit 47 activates only the lower solenoid 46, and it has the phase which energizes the vibrator 42 in the lower direction with reference to the drawing. In addition, when both the power unit and the body are displaced in the rebounding direction by secondary vibrations, only the upper solenoid 45 is excited, and it has the phase which energizes the vibrator 42 in the upper direction with reference to the drawing.

With this vibration-proofing device, because the vibrator is substantially in the form of a plate and is made from a magnetic material, the magnetic flux passing through the vibrator increases, and provides adequate exciting force to the vibrator. Accordingly, it is possible to construct this vibrator in small size and light weight, and its ability to follow up high frequency vibrations is excellent, and its effectiveness in preventing the transmission of vibration becomes even greater.

Next, the operation of the first embodiment of the vibration-proofing device is explained.

In a vehicle, the mounting device which supports the power unit on the body is loaded with both a high frequency low amplitude vibration from the power unit, and a low frequency high amplitude vibration from the body side. The main components of the former vibration are the vertical vibration resulting from the reciprocating action of the pistons of the power unit, or the roll direction vibration resulting from the component force of the explosive pressure in the combustion chamber of the power unit. This vibration, namely secondary vibration, has the same frequency as a component of the multi degree vibration of the engine rotation of the power unit, and is transmitted to the body as sound, causing a resonant noise inside the vehicle. In addition, the main components of the latter vibration are the vertical vibrations resulting from running on an uneven road surface, or the roll direction vibrations in F.F vehicle, caused by sudden starts and stops of the vehicle. Because this vibration is produced in a frequency range which conforms closely to the resonant frequency of the vibration system of the mounting device (about 20 Hz), the resonance phenomena for shaking the car are generated. Accordingly, the vibration-proofing device positioned between the power unit and the body of the vehicle is required to prevent the transmission of the above-mentioned high frequency vibrations to the body, and also to damp out the abovementioned low frequency vibrations.

In the vibration-proofing device according to the present invention, when the power unit causes the second vibration synchronizing with the component of the multi degree vibration of the engine rotation, brackets 31 and 32 are relatively displaced. Because the first elastic member 39 is deformed by expanding and contracting, a volume change is produced in the first fluid chamber 43 and pulsations are produced in the fluid within the first fluid chamber 43. When both the power unit and the body change in the bounding direction, these pulsations are on the higher pressure side in phase, and when the power unit and the body change in the rebound direction, the pulsations are on the lower pressure side in phase.

At the same time, as previously described, the control circuit 50, according to the crank angle of the engine, controls the solenoids 45 and 46 through the drive circuit 47, and the vibrator 42 activated by the solenoids 45 and 46 vibrates in the vertical direction. Therefore, an opposite phase pulsation to the secondary vibration from the power unit is generated in the fluid in the fluid chamber 43. That is, the vibrator 42 vibrates at the same frequency as the previously mentioned secondary vibrations from the power unit. At the same time, when the pulsations of the fluid contained within the first fluid chamber 43 caused by its secondary vibrations is on the lower pressure side in phase, the vibrator 42 is displaced toward the first fluid chamber 43 to produce pulsations on the higher pressure side in phase in the fluid contained within the first fluid chamber 43. In addition, when the pulsations of the fluid contained within the first fluid chamber 43 caused by the secondary vibrations is on the higher pressure side in phase, the vibrator 42 is displaced toward the side of the second fluid chamber 44 to produce pulsations on the lower pressure side in phase in the fluid contained within the first fluid chamber 43. Accordingly, because the pulsations produced in the fluid within the first fluid chamber 43 by the secondary vibrations of the power unit are absorbed by the pulsations produced in the fluid contained within the first fluid chamber 43 by the vibrations of the vibrator 42, the transmission of such high frequency vibration to the body is limited.

Here, the pulsations counteracting the pulsations produced by the secondary vibrations of the power unit are generated by the vibrator 42, which is made from a ferro-magnetic material, has a plate-shaped form and is activated by the solenoids 45 and 46 installed on both sides of the vibrator in the direction of the vibration. Accordingly, it is possible to make the vibrator 42 as a small-sized, light weight unit. In addition, because a large amount of magnetic flux passes through the vibrator 42, this vibrator 42 can be activated by a comparatively small magnetic force. In other words, because vibrations are produced in the vibrator 42 at higher frequency levels without making the solenoids 45 and 46 large, it is possible to prevent the transmission of vibrations at higher frequency levels. Furthermore, in this embodiment of the present invention, the vibrator 42 is not constructed as a spring vibration system where the vibrator 42 is subjected to resonance phenomena because this vibrator 42 is activated by the solenoids 45 and 46 which are installed on both sides in the direction of the vibrations. Accordingly, it is possible to produce higher frequency vibrations in the vibrator 42, and the follow-up to the high frequency vibration of this vibration-proofing device is even more improved.

Next, when low frequency high amplitude vibrations are generated on the body, the brackets 31 and 32 undergo a relatively large displacement, and the first elastic member 39 undergoes a large deformation. A large pressure difference is produced in both the fluid in the first fluid chamber 43 and the fluid in the second fluid chamber 44. For this reason, the fluid pressure causes the vibrator 42 to adhere to the end surface of the groove 41b, closing off the channel between the first fluid chamber 43 and the second fluid chamber 44, and sealing the fluid in the first fluid chamber 43. Accordingly, the first elastic member 39 is supported by the incompressible fluid in the first fluid chamber 43 and becomes extremely rigid, preventing any substantial vibration in the power unit.

Figure 4:
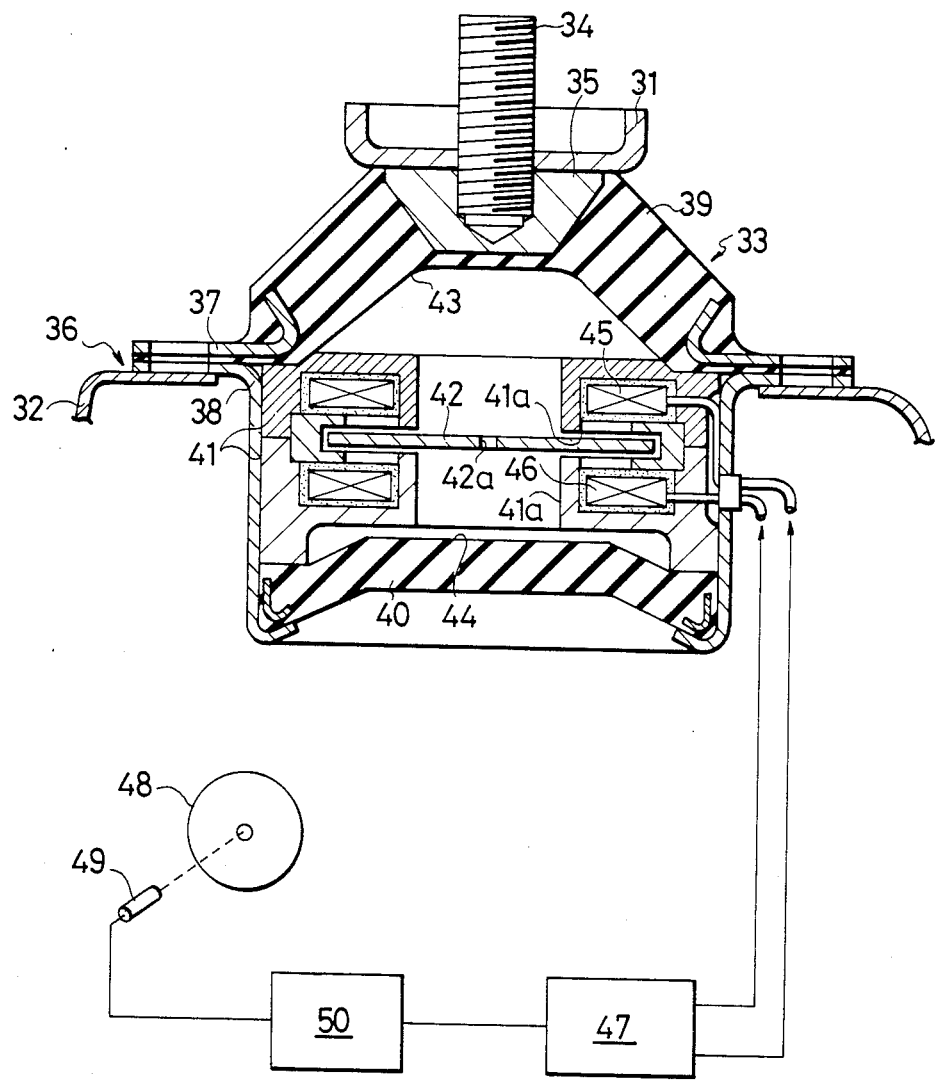
FIG. 4 is a cross-sectional view of a second embodiment of the present invention.

Referring to FIG. 4, there is shown a second embodiment of the vibration-proofing or vibration-isolating device according to the present invention.

In this vibration-proofing device, an orifice 42a is formed close to the center of the vibrator 42, allowing communication between the first fluid chamber 43 and the second fluid chamber 44.

In this vibration-proofing device, when low frequency high amplitude vibrations are generated on the body and a large volumetric change is produced in the first fluid chamber 43, fluid flows through the orifice 42a formed in the vibrator 42 and damps out this vibration. In other words, when the first elastic member 39 undergoes pressure deformation and the volume of the first fluid chamber 43 is reduced, the fluid contained within the first fluid chamber 43 flows through the orifice 42a into the second fluid chamber 44. For this reason, the second elastic member 40 bulges outward and the volume of the second fluid chamber 44 increases. On the contrary, when the first elastic member 39 undergoes a tension deformation and the volume of first fluid chamber 43 increases, the second elastic member 40 bulges inward and the fluid contained within the second fluid chamber 44 flows through the orifice 42a into the first fluid chamber 43. In this way, inconveniences such as shuddering of the vehicle are prevented because this vibration is damped out by the fluid flowing through the orifice 42a. Other details of construction of the second embodiment of the present invention are the same as previously outlined for the first embodiment, so that further explanation will be omitted here.

Referring to FIG. 5, there is shown a third embodiment of the vibration-proofing or vibration-isolating device according to the present invention.

In this vibration-proofing device, the periphery of a flexible or elastic member or diaphragm 51 is fitted into the groove 41b of the casing 41. On both sides of the diaphragm 51 in the vertical direction with reference to the drawing, some disk-shaped diaphragms 52 and 53 made from ferromagnetic material are secured by means of a bolt 55 and a nut 56 to make up a vibrator 54. This vibrator 54 serves as a partition to separate the first fluid chamber 43 and the second fluid chamber 44. In addition, when the diaphragms 52 and 53 vibrate in the vertical direction, the diaphragm 51 comprising a flexible member is distorted. This causes the first fluid chamber 43 and the second fluid chamber 44 to expand or contract.

Also in this embodiment of the vibration-proofing device according to the present invention, the vibrator 54 is light in weight and has good following characteristics with respect to high frequency vibrations, because the two diaphragms 52 and 53 are combined with the diaphragm 51 to form the vibrator 54. In addition, because the two diaphragms 52 and 53 are activated by the solenoids 45 and 46, a large amount of magnetic flux passes through the diaphragms 52 and 53, resulting in the entirely great magnetization, and the exciting force of the vibrator 54 becomes large. Furthermore, because the modulus of elasticity of the diaphragm 51 is so minute that it can be ignored, any vibration system with a resonant frequency is not formed in the present device, and the following characteristics of the present device with respect to high frequency vibration becomes even better. Other details of construction of this third embodiment of the present invention are the same as previously outlined for the first and second embodiments, so that further explanation will be omitted here.

Figure 6:
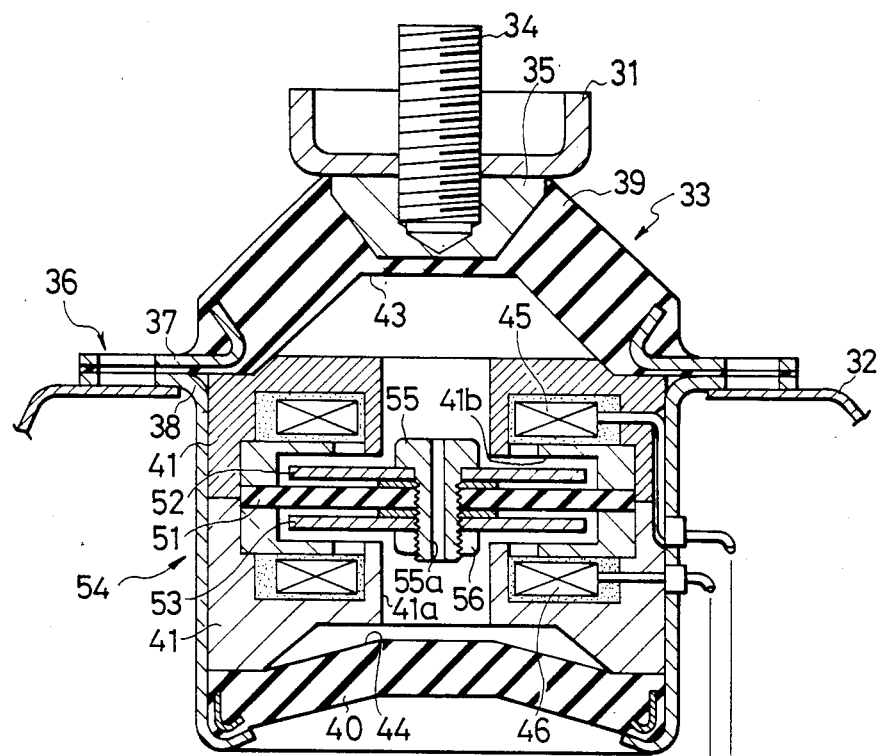
FIG. 6 is a cross-sectional view of a fourth embodiment of the present invention.
Figure 6:
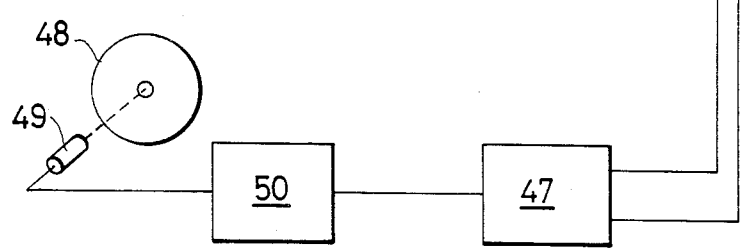

Referring to FIG. 6, there is shown a fourth embodiment of the vibration-proofing or vibration-isolating device of the present invention.

In this vibration-proofing device, as shown in the drawing, an orifice 55a is formed in the bolt 55 of the third embodiment of the vibration-proofing device shown in FIG. 5, providing communication between the first fluid chamber 43 and the second fluid chamber 44.

In this vibration-proofing device, when low frequency high amplitude vibrations are generated on the body, the fluid flows between the first fluid chamber 43 and the second fluid chamber 44 through the orifice 55a, and damps out these vibrations. Accordingly, no large shaking takes place in the power unit, and the generation of resonance phenomena, such as shuddering of the vehicle, is prevented. Other details of construction of this fourth embodiment of the present invention are the same as previously outlined for the third embodiment so that further explanation will be omitted here.

Figure 7:
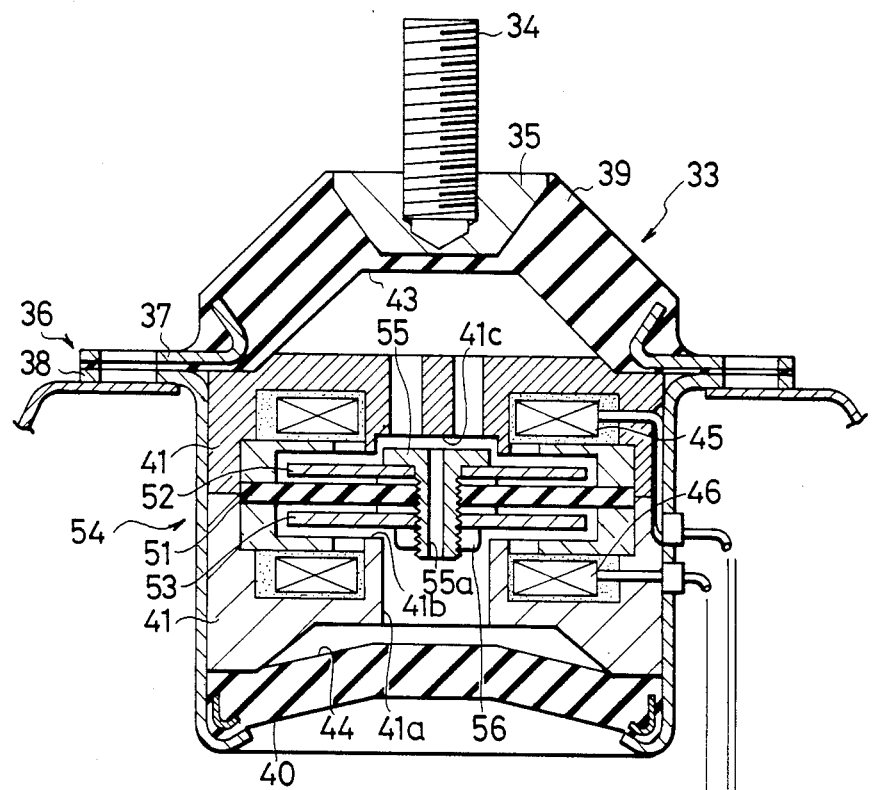
FIG. 7 is a cross-sectional view of a fifth embodiment of the present invention.
Figure 7:
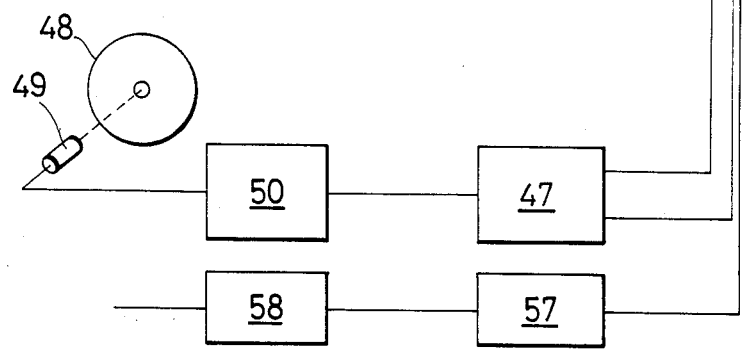

Referring to FIG. 7, there is a fifth embodiment of the present invention.

In this embodiment of the present invention, a valve seat 41c is formed integrally with the casing 41 so as to face the orifice 55a of the vibrator 54. When the vibrator 54 is distorted toward the first fluid chamber 43, the upper end surface of the bolt 55 contacts the valve seat 41c, making it possible to close off the orifice 55a. Also, a rapid-operation detection circuit 58 is joined to the solenoid 45 on the side of the first fluid chamber 43 through a second drive circuit 57. The rapid-operation detection circuit 58 detects the vehicle's rapid rotation, rapid braking, or rapid acceleration by an accelerometer, or by the action of the accellerator pedal, that is, the opening degree of the throttle valve. When the fast acceleration occurs, the rapid-operation detection circuit 58 outputs drive signals to the second drive circuit 57.

In this type of vibration-proofing device, the rapid-operation detection circuit 58 outputs drive signals to the second drive circuit 57 when the vehicle accelerates quickly, and the second drive circuit 57 provides excitation power to the solenoid 45 on the side of the first fluid chamber 43. Accordingly, the vibrator 54 is displaced toward the first fluid chamber 43, and the top end surface of the bolt 55 contacts the valve seat 41c, closing off the orifice 55a so that the first fluid chamber 43 is isolated from the second fluid chamber 44. For this reason, the first elastic member 39 is supported by the incompressible fluid sealed into the first fluid chamber 43, so that no great degree of deformity takes place, thus preventing vibration of the power unit even during rapid acceleration of the vehicle. Other details of construction and use of this embodiment of the present invention are the same as previously outlined for the fourth embodiment, so that further explanation will be omitted here.

Figure 8:
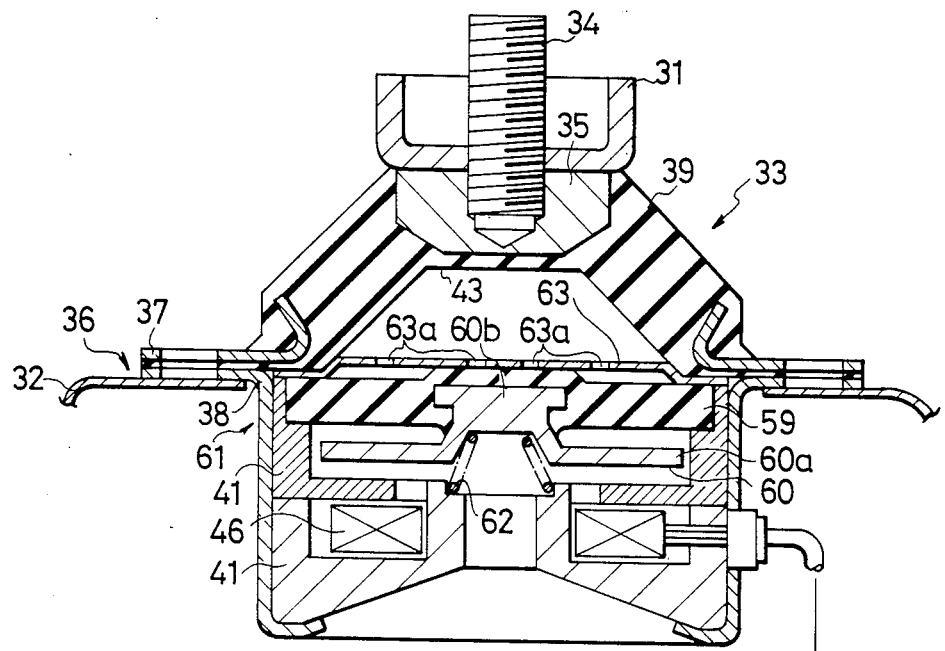
FIG. 8 is a cross-sectional view of a sixth embodiment of the present invention.
Figure 8:
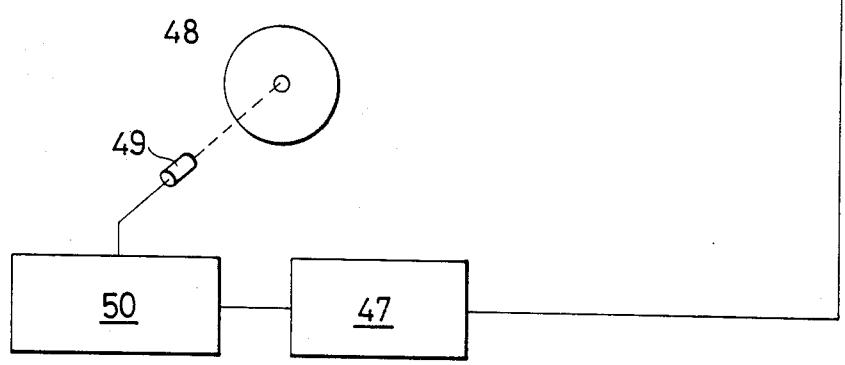

Referring to FIG. 8, there is shown a sixth embodiment of the vibration-proofing or vibration-isolating device of the present invention.

The vibration-proofing device of the embodiment comprises another elastic member 59 of substantially disk shape made from an elastic material like rubber and defing the first fluid chamber 43 with the periphery of the elastic member 59 being fitted in the casing 41, and a vibrating plate or diaphragm 60 for a vibrator 61 provided with a disk portion 60a and a fitting portion 60b which is fitted into the elastic member 59 to secure the diaphragm 60 to the elastic member 59. Disposed between the diaphragm 60 and the casing 41 is a spring 62 to biase the diaphragm 60 toward the first fluid chamber 43.

Disposed within the casing 41 below the disk portion 60a with reference to the drawing is a substantially annular solenoid 46 to excite the diaphragm 60 and attract the same downwardly with reference to the drawing. The solenoid 46 displaces the diaphragm 60 against the biase force of the spring to cause vibrations in the diaphragm 60. The vibrations of the diaphragm 60 causes deform in the elastic member 59 to expand and contract the first fluid chamber 43. Provided between the rigid plate 37 and the casing 41 is a stopper 63 to control any excessive displacement of the diaphragm 61. The stopper 63 has a plurality of ports 63a in network.

In this type of vibration-proofing device, when secondary vibrations are produced in the power unit, the pulsations generated in the fluid contained within the first fluid chamber 43 are offset by the pulsations caused by the vibration of a vibrator 61. To explain in more detail, in the case where the brackets 31 and 32 are displaced toward each other, the first elastic partition 39 is deformed by pressure, and pulsations with the high pressure side phase are generated in the first fluid chamber 43. At this time, the vibrator 61 is powered by the drive circuit 47, based on the output signal of the crank angle sensor 49 for attracting a diaphragm 60 to displace the diaphragm 60 in the lower direction against the elastic force of a spring 62. For this reason, the elastic member 59 is displaced in the lower direction together with the diaphragm 60, causing pulsations in the fluid within the first fluid chamber 43, the pulsations having the lower pressure side phase. Accordingly, these pulsations are offset by pulsations of the secondary vibration from the power unit, and the transmission of vibration to the body is restricted. In the same way, when pulsations having the low presssure side phase are generated by secondary vibrations in the fluid contained within the first fluid chamber 43, the supply of power to the solenoid 46 is terminated, and the diaphragm 60 is displaced toward the first fluid chamber 43 by the spring 62. For this reason, the elastic member 59 also is displaced in the upward direction together with the diaphragm 60, and pulsations with the high pressure side phase are generated in the fluid within the first fluid chamber 43, offsetting the pulsations caused by the secondary vibration. In other words, because the pulsations produced in the fluid within the first fluid chamber 43 by the secondary vibrations with the power unit are offset by pulsations with the opposite phase caused by the vibrator 61, the transmission of these secondary vibrations to the body is prevented.

In addition, in the case where low frequency high amplitude vibrations are produced on the vehicle, because an incompressible fluid is sealed within the first fluid chamber 43 to support the first elastic member 39 thereby providing great rigidity, the first elastic member 39 does not undergo a major deformation, so that high amplitude vibration in the power unit are prevented. Furthermore, in case of this type, damage to the vibrator 61, especially to the elastic member 59, is prevented because excessive upward deformation in the elastic member 59 is prevented by the engagement of the elastic member 59 against the stopper 63 and excessive downward deformation by the engagement of the diaphragm 60 against the casing 41. Other details of construction of the sixth embodiment of the vibration-proofing device of the present invention are the same as previously outlined for the other embodiments, so that further explanation will be omitted here.

Figure 9:
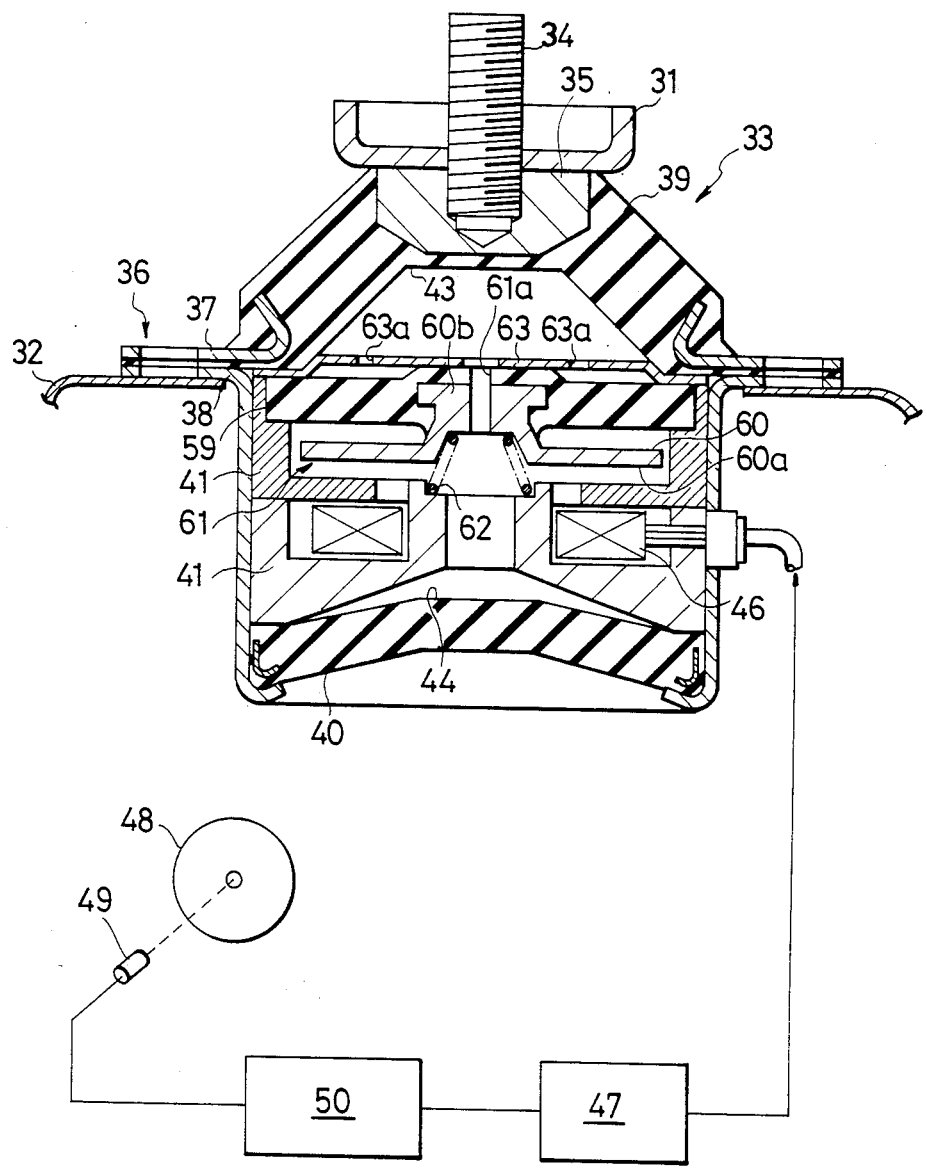
FIG. 9 is a cross-sectional view of a seventh embodiment of the present invention.

Referring to FIG. 9, there is shown a seventh embodiment of the present invention.

As shown in the previously discussed first embodiment of the present invention, in this embodiment, the second elastic member 40 is secured to the opening of the frame member 38 at the lower end thereof, thereby defining the second fluid chamber 44 which is free to expand or contract. There is also an orifice 61a which is formed in the vibrator 61 specifically through the portion of the diaphragm 60 fitted into the elastic member 59, which is now a partition between the first and second fluid chambers, and through the center of the elastic member 59 to allow communication between the second fluid chamber 44 and the first fluid chamber 43.

In this vibration-proofing device, when low frequency high amplitude vibrations are generated in the body and a large deformation is created in the first elastic partition 39, the fluid in the first fluid chamber 43 and the second fluid chamber 44 flows through the orifice 61a and damps out these vibrations. That is, when the first elastic member 39 undergoes an elastic deformation, the fluid contained within the first fluid chamber 43 flows through the orifice 61a into the second fluid chamber 44, causing the second elastic member 40 to expand. In the same way, when the second elastic member 40 undergoes a deformation through expansion, the fluid in the second fluid chamber 44 flows into the first fluid chamber 43, deforming the second elastic member 40, and damps out these low frequency, high amplitude vibrations. Furthermore, when the vibrator 61 vibrates in response to the secondary vibrations described above, because these secondary vibrations are greater than 20 Hz, the fluid does not flow through the orifice 61a. In other words, the pulsations given to the fluid within the first fluid chamber 43 by the vibrator 61 are not affected by the orifice 61a. Other details of construction and use of this embodiment of the present invention are the same as previously outlined for the other embodiments. Other objects and further scope of applicability of the present invention will become apparent from the detailed description given above. It should be understood, however, that the detailed description of a specific example, while indicating a preferred embodiment of the invention, is given by way of illustration only, since various changes and modifications within the spirit and scope of the invention will become apparent from this detailed description to those skilled in the art.

What is claimed is:

1. A compact vibration-proofing device which is provided between a vibrating member and a vibrated member to prevent transmission of the vibrations of the vibrating member to the vibrated member, comprising:
    housing means defining a fluid chamber;
    an elastic member for partially defining said fluid chamber between said vibrating member and said vibrated member;
    a disk-shaped vibrator means, comprising a magnetic member, disposed in said fluid chamber for generating pulsation having opposite phase to that of pulsation produced by said vibrating member, said vibrator means adapted to cooperate with said housing means and said elastic member to divide said fluid chamber into first and second fluid chambers, and
    means for activating said vibrator means comprising a solenoid means positioned adjacent to said vibrator means along the direction of vibration of said vibrator means and a drive circuit means for applying a drive current to said solenoid means,
    wherein the ability to limit transmission of high frequency vibration is improved.

2. A vibration-proofing device as claimed in claim 1, wherein said solenoid means comprises two solenoids which are positioned at both sides of the vibrator means in the direction of the vibration of the vibrator means.

3. A vibration-proofing device as claimed in claim 1, wherein said vibrator means further comprises a flexible member and said magnetic member comprises two diaphragms secured to said flexible member at opposite sides there of by a bolt means.

4. A vibration proofing device as claimed in claim 1, in which the vibrator means comprises an elastic member, said magnetic member comprises a diaphragm of magnetic material fixed to the elastic member substantially at the center thereof, and a spring means for biasing the diaphragm, wherein the activating means comprises a solenoid adapted to activate the vibrator means so as to oppose the force of said spring means.

5. A vibration-proofing device as claimed in claim 1, further comprising;
    means for detecting the frequency of vibration of said vibrating member, and
    means responsive to said detecting means for controlling said activating means as a function of the frequency detected by said vibration detecting means.

6. A vibration-proofing device as claimed in claim 5, in which said vibration frequency detecting means comprises a crank angle sensor for detecting a crank angle of a crankshaft of a power unit, and said controlling means comprises a control circuit which outputs pulse signal synchronous with secondary vibrations of said vibrating member to said activating means.

* * * * *